(12) United States Patent
Donat et al.

(10) Patent No.: US 6,396,398 B1
(45) Date of Patent: May 28, 2002

(54) METHOD AND APPARATUS FOR SAFE SINGLE-CHANNEL EVALUATION OF SENSOR SIGNALS

(75) Inventors: Albrecht Donat, Dachsbach; Andreas Kuhn, Erlangen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/916,417

(22) Filed: Jul. 27, 2001

(30) Foreign Application Priority Data

Aug. 2, 2000 (DE) .......................................... 100 37 737

(51) Int. Cl.[7] .............................................. G08B 29/00
(52) U.S. Cl. ........................ 340/508; 340/505; 340/514
(58) Field of Search ................................. 340/501–505, 340/506, 508–514

(56) References Cited

U.S. PATENT DOCUMENTS

| 3,675,210 A | * | 7/1972 | Block et al. .................. 702/66 |
| 4,033,637 A | * | 7/1977 | Leiber ...................... 303/115.4 |
| 4,196,417 A | * | 4/1980 | Fasching et al. ....... 340/870.04 |

* cited by examiner

Primary Examiner—Daryl Pope
(74) Attorney, Agent, or Firm—BakerBotts LLP

(57) ABSTRACT

For the safe evaluation of sensor signals, singular further processing is permitted by producing a redundancy signal in accordance with a prescribed algorithm when the sensor signals are actually generated. The redundant single-channel nature is made possible by virtue of safety-conforming data processing and data transmission being carried out on a single channel by virtue of a downstream processing device deriving dual-channel signals therefrom, by reversing the algorithm, and testing them for plausibility by reciprocal result comparison.

14 Claims, 1 Drawing Sheet

METHOD AND APPARATUS FOR SAFE SINGLE-CHANNEL EVALUATION OF SENSOR SIGNALS

SPECIFICATION

Figure 1:
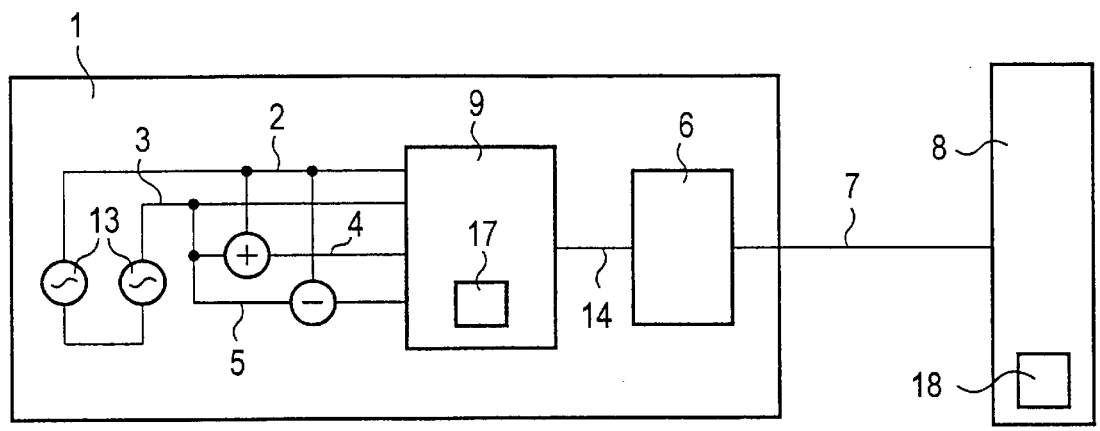

The present invention relates to a method and a corresponding apparatus for safe single-channel evaluation of sensor signals, in particular transmitter signals.

BACKGROUND OF INVENTION

Conventionally, safe sensor evaluation is ensured by multiple redundancy, namely a redundant signal production stage, a redundant evaluation stage and a redundant data transmission stage. In this context, the sensor signals are conditioned by redundant evaluation stages and are forwarded by means of likewise redundant data transfer elements via two separate and hence likewise redundant data lines to a superordinate processing unit. There, the sensor information is conditioned by means of separate evaluation devices, the conditioning results being able to be compared with one another and separate turn-off paths being able to be used to turn off safety-relevant actuators. The multiple redundancy, however; necssitates an increased hardware complexity and, corresponding increased costs for safe sensor evaluation.

It is therefore an object of the present invention to make it possible for sensors used for position detection, for example, to have the signals evaluated and processed further within a hardware module (e.g. an ASIC or microcontroller) and then made available to a superordinate processing device over a data link, with safe sensor evaluation being possible despite single-channel processing by an integrated module.

SUMMARY OF THE INVENTION

In accordance with the present invention, the aforesaid object is achieved by a method for safe evaluation of sensor signals having the following successive method steps:

the sensor signals are diversified by deriving a redundancy signal at an arbitrary point in a hitherto redundant signal processing chain directly from the original sensor signal in accordance with prescribed processing instructions, namely:

original signal and redundancy signal are digitized;

the digital original signal and redundancy signal are converted into a single-channel signal for singular further processing;

this single-channel signal is transmitted on a single channel to a superordinate processing unit;

dual-channel signal results are derived in the superordinate processing unit by reversing the prescribed processing instruction; and original signal and redundancy signal are monitored for plausibility by reciprocal signal result comparison.

This suitable interconnection of the sensor signals permits safe sensor evaluation with a minimum of hardware complexity as a result of quasi-redundancy, and this can also take place within a hardware module. In a preferred embodiment, the redundancy is produced at the foremost point in the signal processing chain when the sensor signals are generated. The redundant single-channel nature produced in this manner permits singular further processing.

On the basis of the diversification of signals in accordance with a known algorithm, for which a person skilled in the art has a large number to choose from, safety-conforming single-channel data processing and data transmission are ensured by virtue of a downstream processing device deriving dual-channel signals therefrom, by reversing the algorithm, and evaluating them.

One advantageous processing algorithm for the method in accordance with the present invention is implemented by deriving a redundancy signal from the original sensor signal by forming the sum and the difference from the signal pair of the original signal as a processing instruction, so that said sum and difference form the signal pair of the redundancy signal.

In accordance with a refinement of the method according to the present invention, it is also possible for just one converter to be required for digitizing the two sensor signals. This reduces the hardware complexity further and this is achieved by the following further method step:

the two sensor signals are digitized by an analog/digital converter using time-division multiplexing by using a changeover switch to alternately route the original signal and the redundancy signal to the analog/digital converter.

In accordance with another preferred refinement of the method according to the present invention, the following further method steps achieve the safety-relevant function by using just one digitization device and a data processing and transmission device:

the digitized original signal and redundancy signal are transmitted on a single channel to two separate evaluation units arranged in the superordinate processing unit;

the associated digitized signal is checked for plausibility by calculating the respective signal result in each evaluation unit; and the signal results of the two evaluation units are compared in the superordinate processing unit.

In accordance with yet another preferred refinement of the method according to the present invention, an error-tolerant transmission protocol is used for the data packet for at least one digitized signal during single-channel transmission to the superordinate processing unit.

In accordance with another alternative refinement of the method according to the present invention, the safety-relevant function is achieved by the following further method steps:

one of the two digitized signals is evaluated in the sensor and a first signal result is calculated;

this first signal result and the other digital signal are converted into a single-channel signal, and the single-channel signal is transmitted on a single channel to the superordinate processing unit;

the second signal result is calculated in the superordinate processing unit; and the two signal results are compared in the superordinate processing unit.

In accordance with another refinement of the alternative method according to the present invention, an error-tolerant transmission protocol is used for the digitized signal and/or the digitized signal result during single-channel transmission to the superordinate processing unit.

The object of the present invention is achieved by an apparatus, corresponding to the inventive method, for safe evaluation of sensor signals, which has the following features:

a signal production means for diversifying the sensor signals by deriving a redundancy signal at an arbitrary point in a hitherto redundant signal processing chain directly from the original sensor signal in accordance with a prescribed processing instruction;

an analog/digital converter for digitizing original signal and redundancy signal;

a means for converting the digital original signal and redundancy signal into a single-channel signal for singular further processing;

a data transmission unit for single-channel transmission of this single-channel signal;

a superordinate processing unit having computation means for deriving dual-channel signal results in the superordinate processing unit by reversing the prescribed processing instruction; and further computation means for monitoring original signal and redundancy signal for plausibility by reciprocal signal result comparison.

In a further preferred embodiment of the apparatus according to the present invention, two evaluation units are provided for reciprocal signal result comparison in the superordinate processing unit.

In accordance with an alternative preferred embodiment of the apparatus according to the present invention, the following further features are provided:

a first evaluation unit is arranged in the superordinate processing unit; and a second evaluation unit is arranged in the sensor which ensures reciprocal signal result comparison using the data transmission unit;

DRAWINGS

Figure 2:
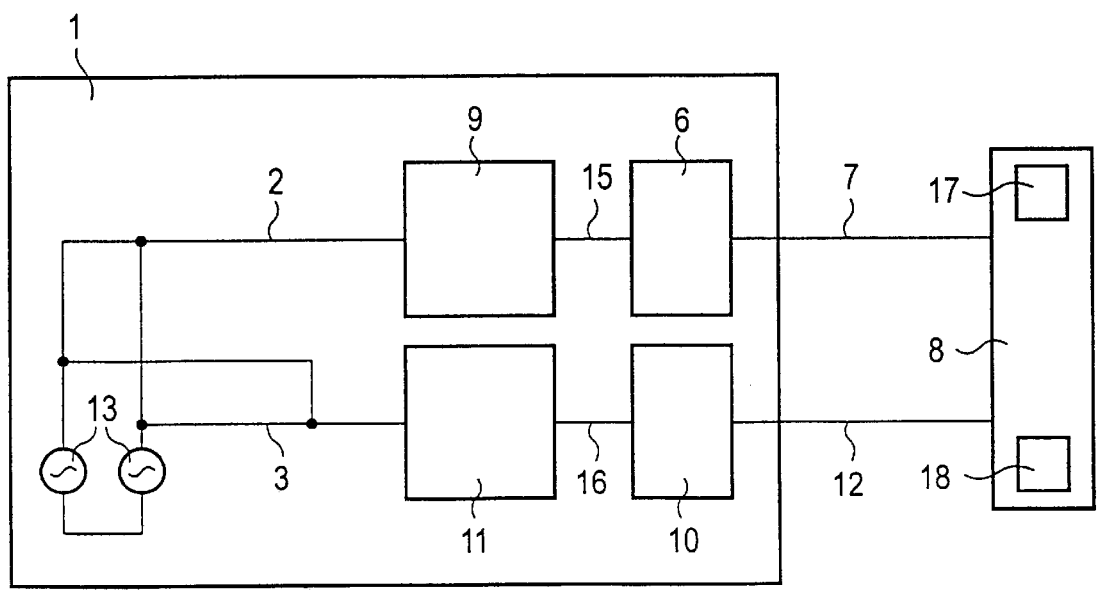

Other advantages and details of the present invention can be found with reference to the description of preferred embodiments which now follows and in conjunction with the Figures, where elements with the same functionality are identified using the same reference symbols, and in which:

FIG. 1 shows a block diagram of single-channel safe sensor evaluation in accordance with the present invention; and FIG. 2 shows a block diagram of safe sensor evaluation in accordance with the known prior art.

DETAILED DESCRIPTION OF THE INVENTION

To be able to present the various features of the invention more clearly with respect to the known prior art, a conventional circuit arrangement in accordance with this prior art will first be illustrated. This is shown in the form of a block diagram in FIG. 2, in which a sensor 1 generates corresponding sensor signals 13 which are routed as a signal pair 2, 3 to two redundant evaluation stages, in the form of analog/digital converters 9, 11, for conditioning. Redundant data transfer elements 6, 10 are used to forward the redundant digitized signals 15, 16 via two separate data lines 7, 12 to a superordinate processing unit 8, where the sensor information is then conditioned using separate evaluation devices 17, 18. In this context, the conditioning results are compared with one another and separate turn-off paths (not shown) can be used to turn off safety-relevant actuators (not shown).

In contrast to the foregoing, the present invention takes a difficult path, one embodiment of which is shown in the block diagram in FIG. 1 in which a sensor 1 generates sensor signals 13. Suitable modification (coding, modulation etc.) of the original signal pair 2, 3 is used to generate a further signal pair 4, 5, which the superordinate processing device can use to detect possible errors in the evaluation block, using measures which are explained in more detail below. The prevention of such possible errors in an evaluation block is also the reason for the conventional redundancy on the basis of the prior art.

The sensor signals 2, 3 and 4, 5 are generally evaluated using an analog/digital conversion stage and a further digital processing stage. The sensor signals are digitized in a known manner by analog/digital converters, with a signal pair being able to be evaluated by one converter. In the prior art example shown in FIG. 2, at least two digitization modules 9, 11 are required in this context in order to ensure the redundancy.

However, if a signal changeover switch (not shown) is connected upstream, digitization can be effected using time-division multiplexing. In the preferred embodiment shown in FIG. 1 it is therefore possible to use just one digitization device 9 and, downstream thereof, just one data transmission unit 6 to ensure a safety-relevant function. This is able to be achieved either by providing the superordinate processing unit 8 with two separate sensor information devices or evaluation devices 17, 18 which permit reciprocal monitoring, or by providing intelligence in the further processing stage 9 for the sensor signals 2, 3 and 4, 5 in the sensor 1 itself, which intelligence ensures the reciprocal result comparison using the data transmission unit 6.

In this context, two advantageous embodiments are possible, among other things. In the first advantageous embodiment, the original signal 2, 3 and the redundancy signal 4, 5 derived therefrom are digitized and are supplied to two separate evaluation units 17, 18 by means of a data transmission device 6. In this context, an error-tolerant transmission protocol may be used for at least one digitized signal. Each evaluation unit 17, 18 tests the signal pairs 2, 3 or 4, 5 for plausibility. The processing device 8 then compares the results of the two evaluation units 17, 18 in the knowledge of the signal generation algorithm.

In the second advantageous embodiment, which forms the basis of the block diagram shown in FIG. 1, one evaluation unit 17 is moved from the processing device 8 to the sensor 1. The first signal result can be calculated directly by the evaluation unit 17 in the sensor 1, while the second signal result, required for ensuring the safety function, is calculated in the superordinate processing unit 8.

In this case too, it is preferred to transmit at least one data packet to the processing unit using an error-tolerant transmission protocol. This may involve both the data packet for the calculated first signal result and that for the digitized unprocessed signal pair, or both. In this case too, the two signal results are compared in the knowledge of the processing algorithm in the superordinate processing unit 8.

The superordinate processing unit 8 further comprises a monitoring block (not shown) which filters-out from the single-channel signal 14 the correctness message from the intelligent evaluation device 17 and forms a second necessary turn-off path for the connected safety-relevant actuators (not shown). If the monitoring block is omitted, then it is also possible to provide an additional line parallel to the data transmission line 7 as the turn-off path.

In accordance with the inventive solution of the present invention, the safety-relevant function can be ensured using just one digitization device 9, a data processing device 6 and a transmission device 7, by diversifying sensor signals 13 in accordance with a known algorithm, and by virtue of safety-conforming single-channel data processing 9 and data transmission 7 being ensured on account of a downstream processing device 8 which is able to derive dual-channel signals therefrom by reversing the algorithm. The present invention achieves the foregoing by producing the redundancy at the foremost point in the signal processing chain, directly after generation of the sensor signals 13, and the singular further processing made possible thereby within the context of a redundant single-channel nature.

What is claimed is:

1. A method for the evaluation of sensor signals generated by a sensor, comprising:

diversifying the sensor signals by deriving a redundancy signal at an arbitrary point in a redundant signal processing chain directly from the original sensor signal in accordance with a prescribed processing instruction;

digitizing the sensor signal and redundancy signal;

converting the sensor signal and redundancy signal into a single-channel signal for further processing;

transmitting this single-channel signal on a single channel to a superordinate processing unit;

deriving dual-channel signal results in the superordinate processing unit by reversing the prescribed processing instruction; and monitoring the sensor signal and redundancy signal for plausibility by reciprocal signal result comparison.

2. The method according to claim 1, wherein the sensor signal is diversified at the foremost point in the signal processing chain directly from the sensor signal in accordance with a prescribed processing instruction.

3. The method accordant to claim 1, wherein the two sensor signals are digitized by an analog/digital converter using time-division multiplexing via a changeover switch to alternately route the sensor signal and the redundancy signal to the analog/digital converter.

4. The method according to claim 1, wherein the digitized sensor signal and redundancy signal are transmitted on a single channel to two separate evaluation units arranged in the superordinate processing unit and wherein the resulting digitized signal is checked for plausibility by calculating the respective signal result in each evaluation unit and the signal results of the two evaluation units are compared in the superordinate processing unit.

5. The method according to claim 4, wherein an error-tolerant transmission protocol is used for at least one digitized signal during single-channel transmission to the superordinate processing unit.

6. The method according to claim 1, wherein one of the two digitized signals is evaluated in the sensor and a first signal result is calculated, and said first signal result and the other digital signal are converted into a single-channel signal which is transmitted on a single channel to the superordinate processing unit; and the second signal result is calculated in the superordinate processing unit and the two signal results are compared in the superordinate processing unit.

7. The method according to claim 6, wherein an error-tolerant transmission protocol is used for the digitized signal and/or the digitized signal result during single-channel transmission to the superordinate processing unit.

8. The method according to claim 1 wherein a redundancy signal is derived from the sensor signal by forming the sum (+) and the difference (−) from the signal pair of the sensor signal as a processing instruction, so that said sum (+) and difference (−) form the signal pair of the redundancy signal.

9. The method according to claim 1, wherein the sensor signals to be evaluated are transmitter signals.

10. An apparatus for safe evaluation of sensor signals generated by a sensor, comprising a signal production device for diversifying the sensor signals by deriving a redundancy signal at an arbitrary point in a redundant signal processing chain directly from the sensor signal in accordance with a prescribed processing instruction; and further comprising an analog/digital converter for digitizing original signal and redundancy signal; a device for converting the digital original signal and redundancy signal into a single-channel signal for singular further processing; a data transmission unit for single-channel transmission of this single-channel signal; a superordinate processing unit having computation capability for deriving dual-channel signal results in the superordinate processing unit by reversing the prescribed processing instruction; and computation capability for monitoring said sensor signal and redundancy signal for plausibility by reciprocal signal result comparison.

11. The apparatus according to claim 10, further comprising two evaluation units for reciprocal signal result comparison in the superordinate processing unit.

12. The apparatus according to claim 10, further comprising a first evaluation unit arranged in the superordinate processing unit and a second evaluation unit which is arranged in the sensor which ensures reciprocal signal result comparison using the data transmission unit.

13. The apparatus according to claim 10 further comprising a signal production device for diversifying the sensor signals by derivation at the foremost point in the signal processing chain directly from the sensor signal in accordance with a prescribed processing instruction.

14. The apparatus according to claim 10 wherein the sensor signals to be evaluated are transmitter signals.

* * * * *